United States Patent
Kwon et al.

(10) Patent No.: US 9,847,537 B2
(45) Date of Patent: Dec. 19, 2017

(54) SYSTEM AND METHOD OF CONTROLLING AIR BLOWER FOR FUEL CELL VEHICLE

(71) Applicants: Hyundai Motor Company, Seoul (KR); Kia Motors Corporation, Seoul (KR)

(72) Inventors: Sang Uk Kwon, Gyeonggi-do (KR); Nam Woo Lee, Gyeonggi-do (KR); Heon Joong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/546,463

(22) Filed: Nov. 18, 2014

(65) Prior Publication Data

US 2016/0006049 A1 Jan. 7, 2016

(30) Foreign Application Priority Data

Jul. 2, 2014 (KR) .......................... 10-2014-0082452

(51) Int. Cl.
| | |
|---|---|
| *H01M 8/04* | (2016.01) |
| *H01M 8/04089* | (2016.01) |
| *H01M 8/04664* | (2016.01) |
| *H01M 8/04746* | (2016.01) |
| *H01M 8/04992* | (2016.01) |

(52) U.S. Cl.
CPC ... *H01M 8/04104* (2013.01); *H01M 8/04664* (2013.01); *H01M 8/04753* (2013.01); *H01M 8/04992* (2013.01); *H01M 2250/20* (2013.01); *Y02T 90/32* (2013.01)

(58) Field of Classification Search
CPC ......... H01M 8/04104; H01M 8/04664; H01M 8/04753; H01M 8/04992; H01M 2250/20; Y02E 60/50; Y02T 90/32
See application file for complete search history.

(56) References Cited

U.S. PATENT DOCUMENTS

| | | | | |
|---|---|---|---|---|
| 5,292,600 A | * | 3/1994 | Kaufman | ............ H01M 8/0213 429/457 |
| 2004/0197614 A1 | * | 10/2004 | Simpson | ........... H01M 8/04089 429/414 |
| 2007/0166584 A1 | | 7/2007 | Kurosawa | |

(Continued)

FOREIGN PATENT DOCUMENTS

| | | |
|---|---|---|
| KR | 2003-0073675 A | 9/2003 |
| KR | 2011-0036448 A | 4/2011 |
| KR | 2012-0004816 A | 1/2012 |

*Primary Examiner* — Miriam Stagg
*Assistant Examiner* — Aaron Greso
(74) *Attorney, Agent, or Firm* — Mintz Levin Cohn Ferris Glovsky and Popeo, P.C.; Peter F. Corless (57) ABSTRACT

A system and method of controlling an air blower for a fuel cell vehicle are provided. The method includes determining an operation amount of an air blower to secure a sufficient air flow rate under present operating conditions and obtaining information regarding clogging of an air channel or information regarding a back pressure using the operation amount of the air blower. In addition, a maximum operating range of the air blower is changed based on whether a present state is an air channel-clogged state or a back pressure-increased state.

13 Claims, 6 Drawing Sheets

(56) References Cited

U.S. PATENT DOCUMENTS

2009/0325010 A1* 12/2009 Kirklin ............ H01M 8/04089
                                                    429/413
2010/0151294 A1*  6/2010 Rainville .......... H01M 8/04201
                                                    429/444

* cited by examiner

SYSTEM AND METHOD OF CONTROLLING AIR BLOWER FOR FUEL CELL VEHICLE

CROSS-REFERENCE TO RELATED APPLICATION

The present application claims priority of Korean Patent Application Number 10-2014-0082452 filed on Jul. 2, 2014, the entire contents of which application are incorporated herein for all purposes by this reference.

BACKGROUND

Field of the Invention

The present invention relates to a system and method of controlling an air blower for a fuel cell vehicle that prevents an abnormal operation of the air blower and maintains a sufficient air flow rate according to extraneous air conditions.

Description of the Related Art

Figure 1:
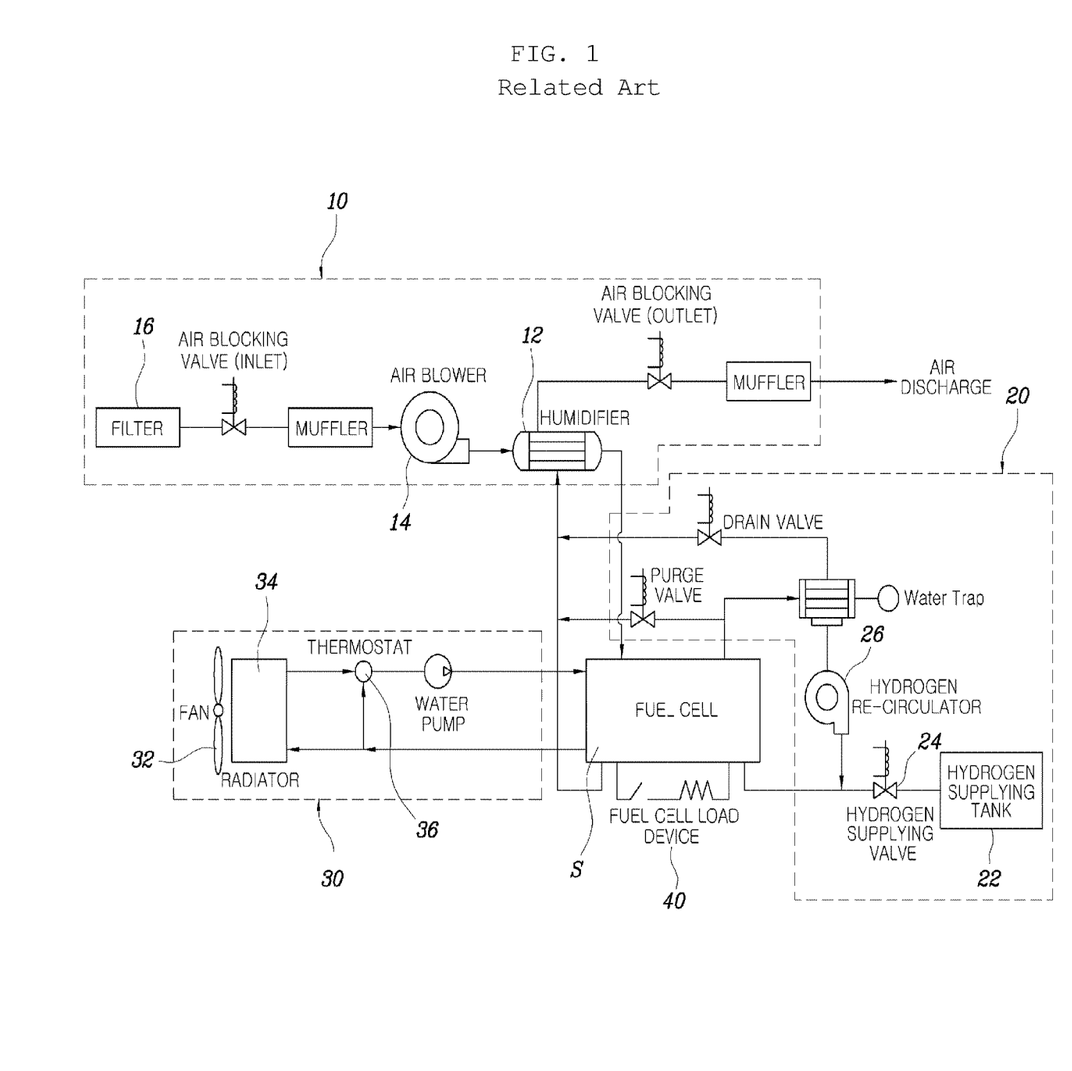
FIG. 1 is an exemplary diagram illustrating a fuel cell system according to the related art.

A fuel cell stack of a fuel cell system produces electricity through an electrochemical reaction of oxygen supplied in the form of air, and hydrogen, which is supplied as fuel, so that the resulting electricity can be used as energy for driving a vehicle. As illustrated in FIG. 1, a fuel cell vehicle includes a fuel cell stack which produces electricity in the fuel cell stack. The fuel cell vehicle also includes an air feeding system 10, a hydrogen feeding system 20, and a cooling system 30 which are used to meet conditions in which an electrochemical reaction for producing electricity can be caused.

The air feeding system 10 includes a humidifier 12 configured to dampen air and supply fuel and damp air to a fuel cell stack S, and an air blower 14 configured to supply oxygen-containing air to moisture. The air blower 14 includes a filter 16 configured to eliminate impurities present in incoming air (e.g., suctioned air) and an air compressor configured to compress air. The hydrogen feeding system 20 includes a hydrogen supply tank 20, a hydrogen supply valve 24 configured to adjust a flow rate of hydrogen (hereinafter, referred to as hydrogen flow rate), and a hydrogen circulating device 26 configured to return a portion of supplied hydrogen gas to a fuel cell. The cooling system 30 includes a radiator 34 and a thermostat 36. The radiator 34 includes a radiator fan 32 configured to eliminate heat from cooling water. The thermostat 36 is configured to adjust a flow rate of cooling water.

The fuel cell vehicle additionally includes a fuel cell load device 40 which prevents a fuel cell from being overcharged. With this structure, hydrogen supplied by the hydrogen feeding system 20 and oxygen supplied by the air feeding system 10 undergo an electrochemical reaction in the fuel cell stack S, producing electricity. This reaction also produces heat and water as byproducts.

In the air feeding system, precise control of the operation of the air blower is necessary to maintain a sufficient amount of air under any driving conditions. Since it is necessary to maintain a sufficient air flow for generation of electricity, the air blower should be operated within an operating limit range to protect components of the air blower and minimize operation noise of the air blower.

When a conventional air blower is used and the operation amount of the air blower is continuously increased to maintain a sufficient air flow rate under conditions in which it is difficult to maintain a sufficient air flow rate, such as when a vehicle is being driven at a substantially high elevation at which atmospheric pressure is substantially low; or when an air channel is clogged by impurities, the air blower may be overloaded. Accordingly, as for the control of the air blower, there is a demand for development of a technology which may maintain a sufficient air flow rate while enabling stable operation the air blower by effectively manipulating with unfavorable driving conditions and systemic troubles.

The foregoing is intended merely to aid in the understanding of the background of the present invention, and is not intended to mean that the present invention falls within the purview of the related art that is already known to those skilled in the art.

SUMMARY

Accordingly, the present invention provides a system and method of controlling an air blower for a fuel cell vehicle to maintain a sufficient flow rate of air supplied to a fuel cell under any unfavorable driving conditions, such as vehicle's driving at a substantially high elevation and to improve stable operation of the air blower by accounting for systemic troubles, such as clogging of an air channel.

One aspect of the present invention provides a method of controlling an air blower in a fuel cell vehicle that may include: determining an operation amount of an air blower to meet a demanded air flow rate under present operating conditions; obtaining information regarding clogging of an air channel or information regarding an increased back pressure while the air blower is operating at the determined operation amount; and correcting a maximum operating range of the air blower according to a determined operation state, an air channel-clogged state or a back pressure-increased state.

The information regarding clogging of the air channel may be obtained by comparing an estimate value of an air flow rate derived from an air flow rate estimator and a measured value of a present air flow rate, and determining whether a difference between the estimated value and the measured value is equal to or greater than a first reference value. The air flow rate estimator may be air flow rate map data used to calculate a present air flow rate with respect to a present operation amount of the air blower, in reference to an air flow rate at atmospheric pressure and mom temperature. The air flow rate estimator may be executed to correct the air flow rate with respect to the present operation amount of the air blower at a present air pressure and a present air temperature by referring to the air flow rate map data based on atmospheric pressure and mom temperature.

To obtain the information regarding the clogging of the air channel, whether a state where the difference between the estimated value and the measured value is equal to or greater than the first reference value is maintained for a predetermined abnormal operation confirmation period may be determined. When the present operation state is determined to be an air channel-clogged state based on the fact that the difference between the estimated value and the measured value is equal to or greater than the first reference value, a maximum operating range of the air blower may be changed to a predetermined safe rotation count.

Further, a warning signal for warning a driver of the air channel-clogged state may be generated when the maximum operating range of the air blower is changed to the safe rotation count. When the difference between the estimated value and the measured value is determined to be equal to or less than the first reference value, whether the difference between the estimated value and the measured value is equal to or less than a first safe standard value may be determined.

Whether the state where the difference between the estimated value and the measured value is equal to or less than the first safe standard value is maintained for a predetermined safety confirmation period or longer may also be determined. In response to determining that the state is maintained for the predetermined safety confirmation period or longer, the maximum operating range of the air blower may be changed to an initial maximum operating range.

To obtain the information regarding the back pressure-increased state, the following control may be performed: a maximum operating range of the air blower under initial conditions may be determined; a reference maximum output limit value of a fuel cell stack under present operating conditions and a maximum output limit value at a present air flow rate may be compared; and whether a difference between the reference maximum output limit value and the maximum output limit value at the present air flow rate is equal to or greater than a predetermined second reference value may be determined.

When a present state is determined to be a back pressure-increased state based on the fact that the difference between the reference maximum output limit value and the maximum output limit value at the present air flow rate is equal to or greater than the second reference value, the maximum operating range of the air blower may be changed to a corrected rotation count. When the difference between the reference maximum output limit value and the maximum output limit value at the present actual air flow rate is equal to or less than the second reference value, whether the difference is equal to or less than a second safe standard value may be determined.

Further, whether a state where the difference between the reference maximum output limit value and the maximum output limit value at the present actual air flow rate is equal to or less than the second safe standard value is maintained for a normal operation confirmation period or longer may be determined. When the difference is maintained for the normal operation confirmation period or longer, the maximum operating range of the air blower may be changed to an initial maximum operating range.

The method of controlling an air blower for a fuel cell vehicle having the structure described above may maintain a sufficient air flow rate by detecting conditions in which an air flow rate should be increased, such as driving at a substantially high elevation, and by increasing a maximum operation amount of the air blower according to the detected conditions. In addition, the structure of the present invention may prevent an abnormal operation of the air blower (e.g., operating under failure or causing failure) by detecting systemic troubles such as clogging of an air channel and reducing the maximum operation amount of the air blower to prevent overload to the air blower. In other words, it may be possible to enhance durability of the air blower by maintaining a sufficient air flow rate even under unfavorable driving conditions, accounting for systemic troubles, and preventing overload to the air blower.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described with reference to the accompanying drawings.

Figure 2:
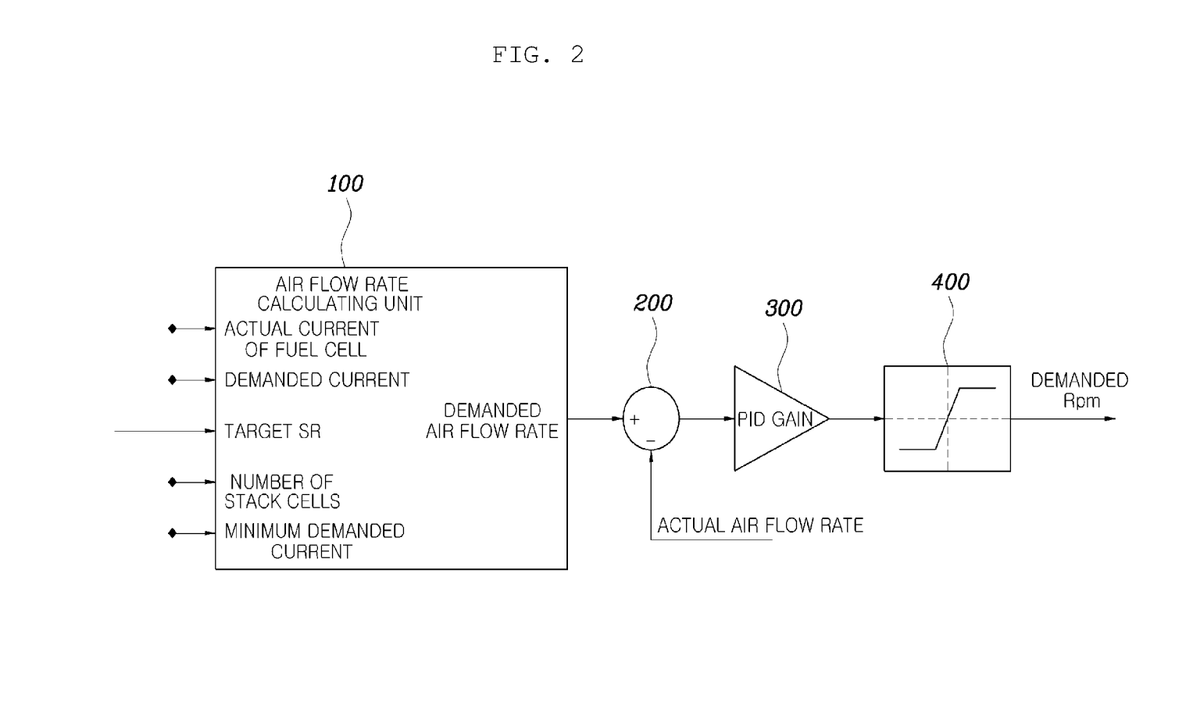
FIG. 2 is an exemplary diagram illustrating a method of determining an operation amount of an air blower according to an exemplary embodiment of the present invention.

In a fuel cell system, as shown in FIG. 2, when determining an operation amount of an air blower (e.g., at what level to operate the air blower or the amount of air to be emitted from the air blower); a demanded air flow rate calculating unit 100 may be configured to calculate a demanded air flow rate based on an output current of a fuel cell, a demanded current for driving a fuel cell vehicle, an air supercharging ratio (target SR) based on actual current consumption, the number of stack cells, and the like; and an incoming-air flow rate measuring unit 200 configured to measure an air flow rate of incoming air and compare the measured air flow rate and the demanded air flow rate. The demanded air flow rate calculating unit 100 and the incoming-air flow rate measuring unit 200 may be executed by a controller having a processor and a memory.

Further, the number of rotations of the air blower may be determined based on a difference between the measured air flow rate and the demanded air flow rate through feedback PID GAIN control 300. A command value of the number of rotations of the air blower may be determined through post processing 400 in which an operating limit range, a temperature, and an emergency operation may be accounted for.

According to the present invention, an appropriate air flow rate may be maintained and the air blower may be prevented from being overloaded by detecting an exterior driving condition in which it may be difficult to maintain a sufficient air flow rate, or detecting an increased back pressure attributable to systemic troubles.

Figure 3:
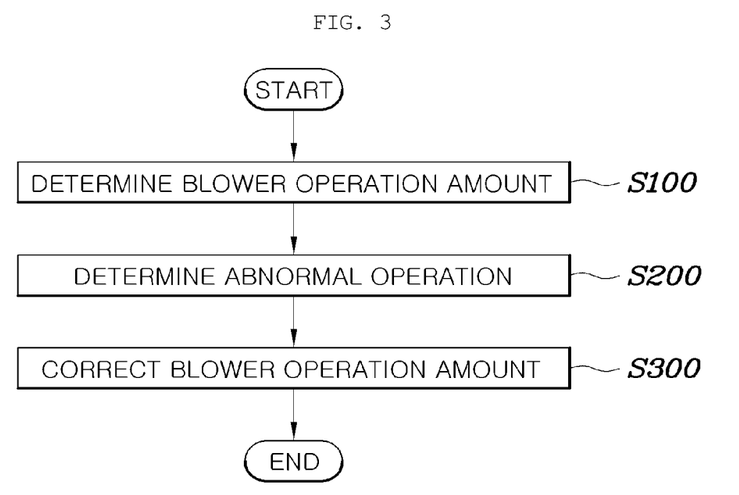
FIG. 3 is an exemplary flowchart illustrating a method of controlling an air blower for a fuel cell vehicle according to an exemplary embodiment of the present invention.

Therefore, as illustrated in FIG. 3, a method of controlling an air blower for a fuel cell vehicle according to one exemplary embodiment of the present invention may include: determining an operation amount of the air blower, which satisfies demands for the amount of air under present operating conditions (S100); determining an air channel-clogged state or a back pressure-increased state by obtaining information regarding clogging of an air channel or information regarding an increase in back pressure while the air blower is operating at the determined operation amount of the air blower (S200); and changing a maximum operating range according to the detected state to account for the air channel-clogged state or the back pressure-increased state (S300).

In particular, in step S100, the operation amount of the air blower which may satisfy the air flow rate demanded under the present operating conditions may be determined by the controller. The demanded air flow rate calculated by the demanded air flow rate calculating unit 100 and the measured air flow rate measured by the incoming air flow rate measuring unit may be compared with each other, and the operation amount of the air blower may be determined such that the actual air flow rate (measured value) reaches the demanded air flow rate. In other words, when the measured air flow rate of incoming air is greater than the demanded air flow rate, the operation amount of the air blower may be reduced. Further, when the measured air flow rate of incoming air is less than the demanded air flow rate, the operation amount of the air blower may be increased so that the actual air flow rate reaches the demanded air flow rate.

However, when an air channel is clogged in an air blower system, the amount of supplied air may be insufficient due to the clogging of the air channel. Therefore, to enable a sufficient amount of air to be supplied to a fuel cell stack, the operation amount of the air blower may be increased, potentially resulting in damage to the air blower or in separation of an impeller from the air blower, which may cause an increase in injury risk. When a vehicle is driving at a substantially high elevation where atmospheric pressure is substantially low, the amount of incoming air may be insufficient compared to driving on a plane area (e.g., a substantially flat or even surface).

The present invention may be configured to determine whether the air channel-clogged state or the back pressure-increased state occurs, and maintain a sufficient air flow rate by varying the maximum operating range according to the present operating conditions. The abnormal operation determination step S200 may include obtaining information regarding clogging of an air channel or information regarding an increase in back pressure, and changing the maximum operating range according to the present operating conditions (e.g., the air channel-clogged state or the back pressure-increased state).

According to the first exemplary embodiment, clogging of the air channel may be determined by comparing an estimated value of an air flow rate derived from an air flow rate estimator and a measured value of the present actual air flow rate of incoming air. The air flow rate estimator may include data of an air flow rate map in which air flow rates of incoming air (e.g., suctioned air) are mapped with the numbers of rotations of the air blower at atmospheric pressure and about room temperature. The number of rotations of the air blower at a present air pressure and a present air temperature may be determined relative to the number of rotations of the air blower at atmospheric pressure and about room temperature.

Specifically, the air flow rate estimator may be configured to compare the air flow rate map data based on atmospheric pressure and mom temperature with a present air pressure and a present air temperature to correct the air flow rate with respect to the operation amount of the air blower, thereby more precisely determining whether the present state of a system, that is, whether the air channel-clogged state or the back pressure-increased state occurs.

After the estimated value of the air flow rate, which may be estimated based on the map data of the air flow rate estimator, is compared with the measured value of the actual air flow rate the air channel may be determined to be clogged based on the fact that a difference between the estimated value and the measured value is equal to or greater than a first reference value. The reference value may be a value obtained through experiments of comparing the estimated value and the measured value. The reference value may vary depending on vehicles.

In addition, by using the information regarding the clogging of the air channel, whether the difference between the estimated value and the measured value is continuously equal to or greater than the first reference value for a predetermined abnormal operation confirmation period may be determined. In other words, by setting the abnormal operation confirmation period, it may be possible to more precisely determine occurrence of the clogging of the air channel. The clogging of the air channel may not be immediately determined when the difference between the estimated value of the air flow rate and the measured value of the air flow rate is greater than the first reference value but determined when the state where the difference between the estimated value and the measured value is greater than the first reference value is maintained for the abnormal operation confirmation period.

As described above, when the difference between the estimated value and the measured value is greater than the first reference value and the clogging of the air channel may be determined, the maximum operating range of the air blower may be changed to a predetermined safe rotation count. In other words, by changing the maximum operating range of the air blower to the safe rotation count when malfunctioning of a system, such as clogging of an air channel, occurs, it may be possible to prevent the air blower from overworking while securing a sufficient air flow rate when the air flow rate is reduced due to errors such as the clogging of the air channel. Furthermore, it may be possible to maintain a sufficient air flow rate even during an occurrence of the clogging of the air channel.

The safe rotation count may be set to be less than the operation amount of the air blower to satisfy the air flow rate under the present operating conditions, i.e., the air channel-clogged state. However, the safe rotation count may be set to secure a particular degree (e.g., amount) of air flow rate while allowing slight overload of the air blower. In other words, although the air blower may be set to be operated within a safe operating range, the safe rotation count may be set to a value which slightly exceeds the safe operating range to secure a particular degree of air flow rate even under a condition in which a vehicle pressure is increased due to the clogging of the air channel.

In particular, the safe operating range may refer to an upper limit of rotating speed of the air blower at which the operation amount of the air blower is at a maximum. When the rotating speed of the air blower is increased to exceed the safe operating range, the air blower may be damaged. Accordingly, the safe operating range may be a safe range used to prevent the air blower from being operated at over critical rotating speed. Additionally, a warning signal for warning a driver of the clogging of the air channel may be generated when the maximum operating range of the air blower is changed to the safe rotation count. The warning signal may be a flashing of light on an electronic instrument cluster to allow the driver of a vehicle to recognize malfunctioning of a system.

Figure 4:
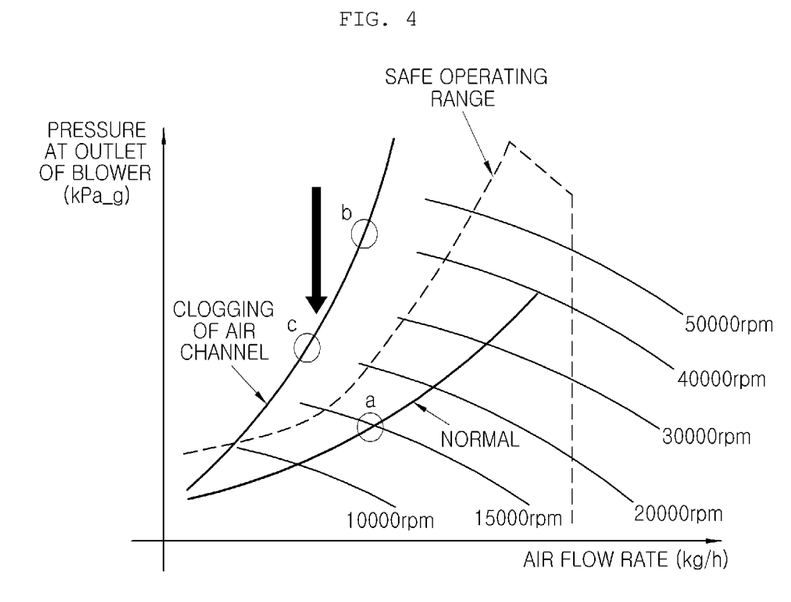
FIG. 4 is an exemplary diagram used to describe a method of controlling an air blower for a fuel cell vehicle according to a first exemplary embodiment of the present invention under a condition in which a systemic trouble occurs.

Hereinafter, the air channel-clogged state will be described in more detail with reference to FIG. 4.

In normal operation, that is, when the air blower is normally operated (e.g., operated without malfunction) and a sufficient air flow rate is secured therefore, the air blower may be operated in a state where the rotation count of the air blower is set to a value within "a" zone. However, when the air channel is clogged due to, for example, impurities suctioned into the air channel or malfunctioning of a valve which controls an opening of the air feeding system, the vehicle pressure may increase. In this case, the rotation count of the air blower may increase to a value within "b" zone to maintain or secure a sufficient air flow rate. In other words, the air blower may be overloaded, causing potential damage to the air blower.

Accordingly, it may be necessary to determine a risk of clogging of the air channel by comparing the estimated value derived from the air flow rate estimator and the measured air flow rate and to reduce the maximum operating range of the air blower to the predetermined safe rotation count which is a value within "c" zone when the air channel is determined to be clogged. Accordingly, it may be possible to prevent overload of the air blower. When the difference between the estimated value and the measured value of the air flow rate is equal to or less than the first reference value, the controller may be configured to determine that the difference between the estimated value and the measured value of the air flow rate is equal to or less than a first safe standard value.

The first safe standard value may be a value used to determine a state where the air channel is unclogged. The first safe standard value may be set based on a sufficient air flow rate satisfied under the present operating conditions (e.g., the air flow rate that is determined to be sufficient based on the present operating conditions). In other words, when the difference between the estimated value and the measured value of the air flow rate is equal to or less than the first reference value, whether the difference reaches the first safe standard value may be determined. Accordingly, it may be possible to more precisely determine whether a systemic problem attributable to the clogging of the air channel is solved, thereby enabling more stable operation of the air blower. In addition, whether the state where the difference between the estimated value and the measured value is equal to or less than the first safe standard value is maintained for a predetermined safety confirmation period or longer may be determined. When the state is determined to be maintained for the predetermined safety confirmation period, the maximum operating range of the air blower may be changed to an initial operating range.

With setting of this the safety confirmation period, it may be possible to more precisely determine whether the air channel becomes unclogged and whether air is being supplied at a sufficient air flow rate. In other words, the determination that the air channel becomes unclogged may not be determined immediately when the difference between the estimated value and the measured value of the air flow rate becomes equal to or less than the first safe standard value but may be determined when the state where the difference between the estimated value and the measured value of the air flow rate is equal to or less than the first safe standard value is maintained for the safety confirmation period.

Figure 5:
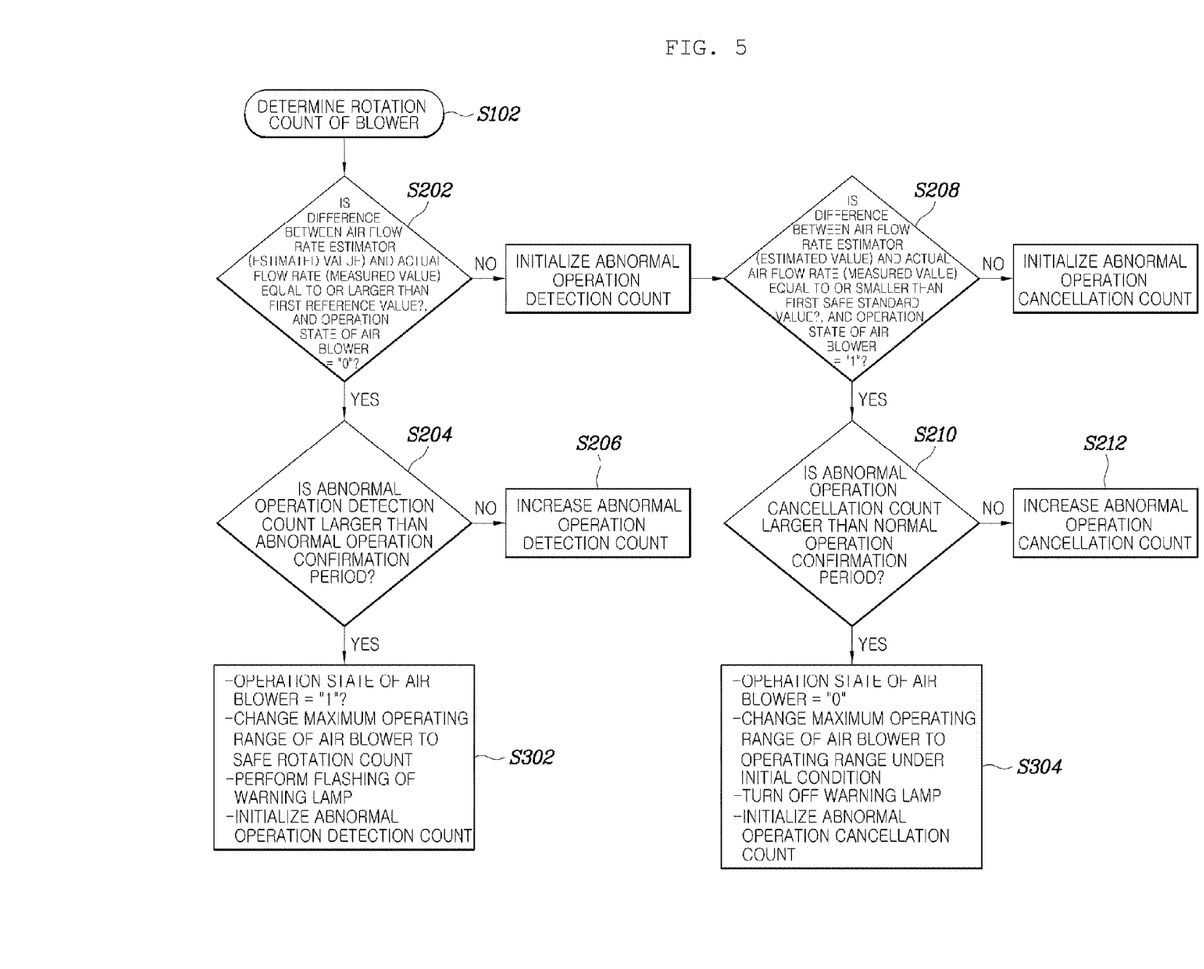
FIG. 5 is an exemplary flowchart illustrating the method of controlling the air blower for the fuel cell vehicle according to the first exemplary embodiment of the present invention.

Hereinafter, the process of determining that the air channel becomes unclogged is described in greater detail with reference to FIG. 5. First, a rotation count of the air blower may be set, and then the air blower may be operated at the speed of the determined rotation count (S102). While the air blower is operating at rotation count, the difference between the estimated value of the air flow rate, estimated from the air flow rate estimator, and the measured value of the actual air flow rate of incoming air may be compared with the first reference value to determine whether the operation of the air blower is normal (e.g., whether a malfunction or error has occurred) (S202).

When the difference between the estimated value and the measured value of the air flow rate is greater than the first reference value and when the air blower is determined to be operating within a normal operating range, whether an abnormal operation detection count is maintained for an abnormal operation confirmation period or longer may be determined. When the abnormal operation detection count does not reach the abnormal operation confirmation period, the abnormal operation detection count may be increased gradually (S206). When the abnormal operation detection count is increased to reach the abnormal operation confirmation period, the controller may be configured to determine that the air channel is clogged, and then the maximum operating range of the air blower may be changed by the controller to the safe rotation count (S302).

Moreover, the operation state of the air blower may be changed to the abnormal operation state and the warning lamp may be configured to flash to warn the driver of the abnormal operation. Then, the abnormal operation detection count may be initialized to further determine whether a pipeline is clogged. When the difference between the estimated value and the measured value of the air flow rate is equal to or less than the first reference value or when the operation state of the air blower is the abnormal operation state, the abnormal operation detection count may be initialized, and the controller may be configured to determine whether the difference between the estimated value and the measured value of the air flow rate is equal to or less than the first safe standard value, and whether the operation state of the air blower is the abnormal operation state (S208).

When the difference between the estimated value and the measured value of the air flow rate is equal to or less than the first standard value and the operation state of the air blower is determined to be the abnormal operation state, the controller may be configured to determine whether an abnormal operation cancellation count is maintained for an safety confirmation period or longer (S210). When the abnormal operation cancellation count does not reach the safety confirmation period, the abnormal operation cancellation count may be gradually increased (S212). When the abnormal operation cancellation count is increased to reach the safety confirmation period, the controller may be configured to determine that the air channel becomes unclogged, so that the maximum operating range of the air blower is changed to the initial operating range (S304).

Therefore, the operation state of the air blower may be switched to the normal operation state and the warning lamp may be turned off. Then, the abnormal operation cancellation count may be initialized to further determine whether a pipeline is clogged. This operation may repeatedly monitor malfunctioning of the system and operate the air blower. With reference to FIG. 5, initialization and increase of each count, and determination and cancellation of the pipeline-clogged state may be performed repeatedly, following Step S102, to consistently determine the pipeline-clogged state.

According to a second exemplary embodiment of the present invention, information regarding an increase in back pressure may be obtained. In other words, the controller may be configured to determine whether the operation amount of the air blower is set to a maximum operating range which is set under initial conditions at step S100. While the air blower is operating at the operation amount within the maximum operating range, a reference maximum output limit value of the fuel cell stack under present operating conditions and a maximum output limit value at a present actual air flow rate of incoming air may be compared to determine whether a difference between the reference maximum output limit value and the maximum output limit value at the present air flow rate is equal to or greater than a second reference value.

When a vehicle is being driven at a substantially high elevation where atmospheric pressure is substantially low, the amount of incoming air may be insufficient, compared with driving on a plane area (e.g., a substantially flat or even surface). In particular, the number of rotations of the air blower may be increased to maintain a predetermined air flow rate, to increase the operation amount of the air blower to the maximum operating range. To determine the state where it may be difficult to maintain the predetermined air flow rate due to an increase in back pressure attributable to driving at a high elevation, the reference maximum output limit value of the fuel cell stack and the maximum output limit value at the present air flow rate may be compared. The reference maximum output limit value of the fuel cell stack may be a maximum current limit value of the fuel cell stack according to temperature and voltage of the fuel cell stack, and the maximum output limit value at the preset air flow rate may be a maximum current limit value of the fuel cell stack according to an air flow rate of incoming air.

Figure 6:
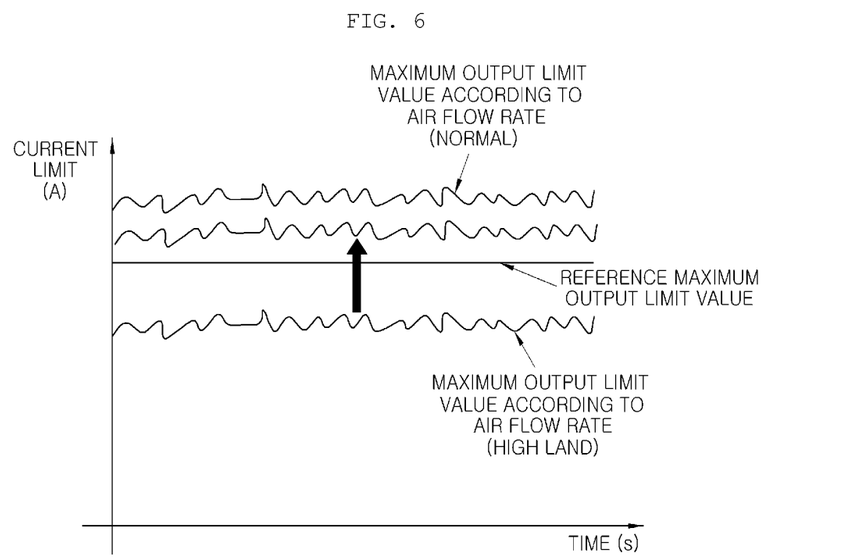
FIGS. 6 to 7 are exemplary diagrams used to describe a method of controlling an air blower for a fuel cell vehicle according to a second exemplary embodiment of the present invention, under a condition where a driving condition is unfavorable.

In other words, as illustrated in FIG. 6, a sufficient air flow rate may be maintained on a plane area when the air blower is operating normally, to maintain the state where the maximum output limit value according to the air flow rate to be greater than the reference maximum output limit value. However, when the vehicle is being driven on a substantially high incline where atmospheric pressure is substantially low, since it may be difficult to maintain a sufficient air flow rate due to an increased back pressure, the reference maximum output limit value may be maintained but the maximum output limit value at the present air flow rate of incoming air may be decreased to lower than the reference maximum output limit value.

In response to determining that the difference between the reference maximum output limit value and the maximum output limit value at the present air flow rate is equal to or greater than the second reference value, that is, in response to determining that the back pressure is increased, the maximum operating range of the air blower may be changed to a predetermined corrected rotation count. In other words, by increasing the maximum operating range of the air blower to the corrected rotation count when the back pressure is increased as a vehicle drives at a substantially high elevation, the operation amount of the air blower may be increased to prevent insufficiency in the amount of air.

However, in response to determining that the present state is the back pressure-increased state, the air blower may be operated immediately at the corrected rotation count in response to a driver's intension by leaving the detecting confirmation period as unset. Additionally, in response to determining that the difference between the reference maximum output limit value and the maximum output limit value at the present air flow rate is equal to or less than the second reference value, whether the difference is equal to or less than a second safe standard value may be determined.

Moreover, whether the back pressure-increased state is canceled may be determined more precisely by additionally determining whether the difference between the reference maximum output limit value and the maximum output limit value at the present air flow rate reaches the second safe standard value, when the difference is determined to be equal to less than the second reference value. Further, whether the state in which the difference between the reference maximum output limit value and the maximum output limit value at the present air flow rate is equal to or less than the second safe standard value is maintained for a predetermined normal operation confirmation period or longer may be determined. In response to determining that the state is maintained for the normal operation confirmation period or longer, the maximum operating range of the air blower may be changed to the initial operating range.

By setting the normal operation confirmation period and determining whether the state where the difference between the reference maximum output limit value and the maximum output limit value at the present air flow rate is equal to or less than the second safe standard value is maintained for the normal operation confirmation period, it may be possible to more precisely determine whether the back pressure-increased state is canceled and ensure a sufficient amount of air is supplied.

Figure 7:
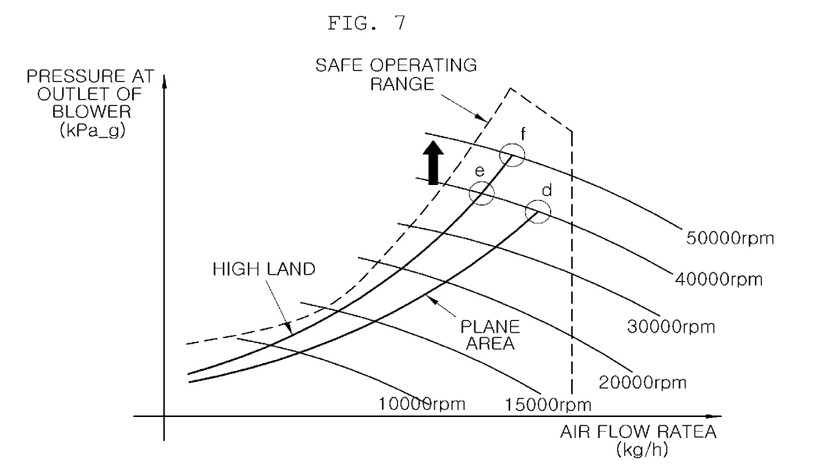

Hereinafter, the back pressure-increased state will be described in more detail with reference to FIG. 7. The air blower may be operated at the rotating speed (e.g., the number of rotations) within "d" zone when the vehicle is being driven on a plane area with a substantially low altitude. However, when the air blower is operated at the same rotating speed as the rotating speed on a plane area even when a vehicle drives at a substantially high elevation (e.g., a higher elevation than the plane area) where atmospheric pressure is substantially low, the air flow rate may be reduced to fall within "e" zone, to prevent a sufficient amount of air from being supplied.

Figure 8:
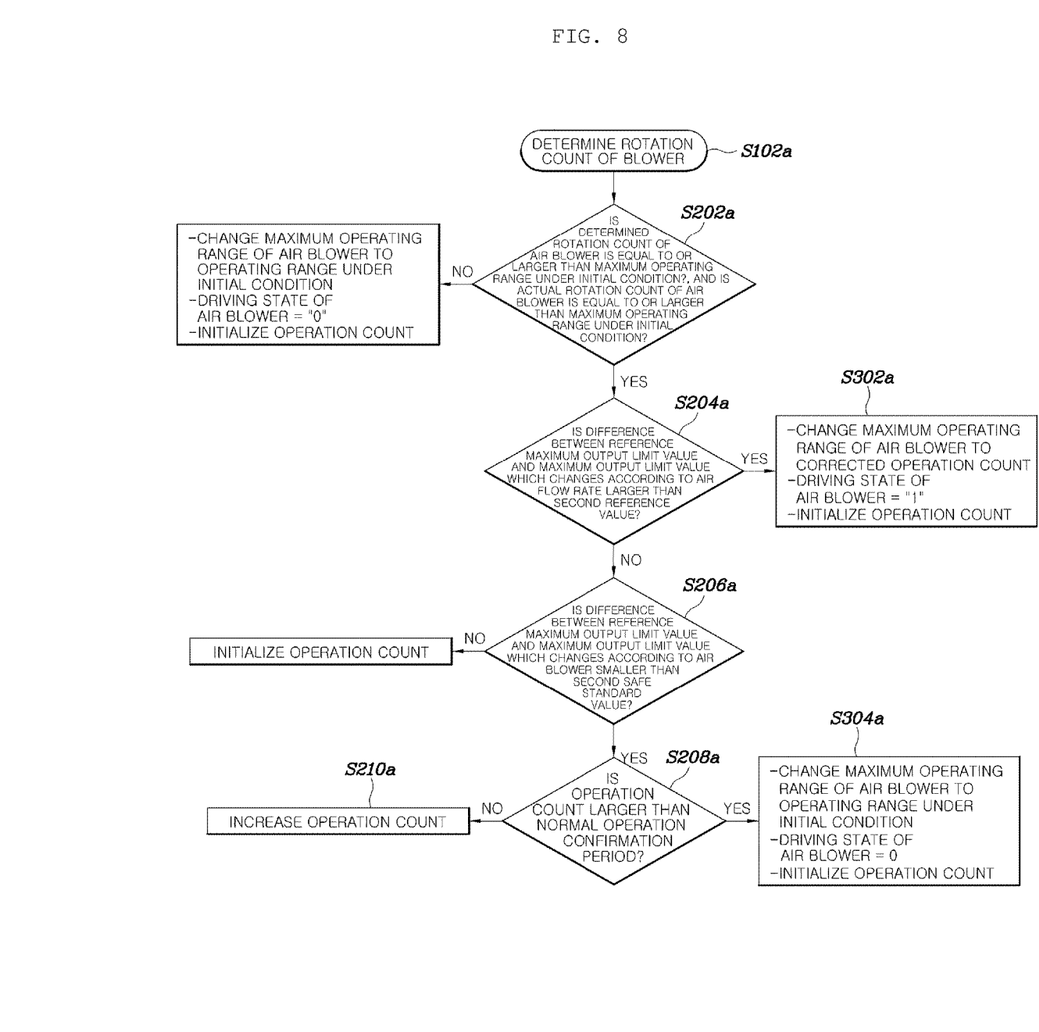
FIG. 8 is an exemplary flowchart illustrating the method of controlling the air blower for the fuel cell vehicle according to the second exemplary embodiment of the present invention.

In particular, when the air blower is operated at the maximum operating range set under initial conditions, whether the vehicle starts driving at a high elevation may be determined by the controller by comparing the reference maximum output limit value and the maximum output limit value at the present air flow rate. Through this control, the back pressure-increased state such as driving at a high elevation may be determined, and the maximum operating range of the air blower may be increased to the corrected rotation count when the back pressure-increased state occurs, to increase the amount of supplied air. In other words, as illustrated in FIG. 8, the insufficient amount of air may be supplemented by increasing the maximum operating range of the air blower to the corrected rotation count within "f" zone. Since the air blower may be operated at the maximum operating range, the corrected rotation count may be increased up to a range which does not exceed the safe operating range.

The back pressure-increased state will be described in more detail with reference to FIG. 8. When the rotation count of the air blower is determined (S102a), whether the determined rotation count of the air blower is the maximum operating range which is set under initial conditions may be determined (S202a). In particular, when determining the rotation count of the air blower, whether the determined rotation count of the air blower is the maximum operating range set under initial conditions may be determined. In other words, whether a present actual rotation count of the air blower is the maximum operating range set under the initial conditions may be determined.

In response to determining that the operation amount of the air blower is the maximum operating range set under the initial conditions, whether the difference between the reference maximum output limit value and the maximum output limit value at the present air flow rate is equal to or greater than the second reference value may be determined (S204a). In addition, in response to determining that the difference is equal to or greater than the second reference value, the present state may be determined to be the back pressure-increased state, to change the maximum operating range of the air blower to the corrected rotation count (S302a). Accordingly, the operation state of the air blower may be set to an abnormal state and an operation count may be initialized.

Moreover, when the difference between the reference maximum output limit value and the maximum output limit value at the present air flow rate is equal to or less than the second reference value, whether the difference between the reference maximum output limit value and the maximum output limit value at the present air flow rate is equal to or less than the second safe standard value and whether the operation state is the abnormal state may be determined (S206a). When affirmative determinations are made, whether the operation count reaches a predetermined normal operation confirmation period or longer may also be determined (S208a). When the operation count does not reach the normal operation confirmation period, the operation count may be increased (S210a). When the operation count is increased to reach the normal operation confirmation period or longer, the controller may be configured to determine that a pipeline is unclogged, then the maximum operating range of the air blower may be changed to a value under initial conditions, and finally the operation count may be initialized (S304a).

According to the flowchart of FIG. 8, the initialization and increase of each count may be repeatedly performed and the confirmation and cancellation of the back pressure-increased state may be repeatedly performed, following the blower rotation count determination step (S102) to continuously monitor the back pressure-increased state. In other words, the above-described control may be repeatedly performed to detect the back pressure-increased state, thereby appropriately controlling the air blower.

As described above, the method of controlling an air blower for a fuel cell vehicle according to the present invention may include: determining, by a controller, an operation amount of the air blower demanded under present driving conditions by determining whether an air channel is clogged (called "air channel-clogged state"); determining, by the controller, whether a present state is the air channel-clogged state by comparing an estimated value of an air flow rate and a measured value of a present actual air flow rate while the air blower is operating at the operation amount of the air blower; and reducing, by the controller, a maximum operating range of the air blower to a safe rotation count, when the air channel is determined to be currently clogged. In particular, the method includes comparing, by the controller, an estimate value of an air flow rate derived from an air flow rate estimator and a measured value of a present air flow rate, and determining that the air channel is clogged when a difference between the estimated value and the measured value is equal to or greater than a first reference value.

In response to determining that a back pressure is increased, the following control is performed. That is, the control may include: determining an operation amount of an air blower which may satisfy an air flow rate demanded under present operating conditions; comparing a reference maximum output limit value of a fuel cell stack under the present operating conditions and a maximum output limit value at a present air flow rate, when the operation amount of the air blower which is determined to be the maximum operating range which is set under initial conditions; and increasing the maximum operating range of the air blower to a stored corrected rotation count, in response to determining that a present state is the back pressure-increased state. The back pressure-increased state determination may include determining that the present state is the back pressure-increased state when the difference between the reference maximum output limit value and the maximum output limit value at the present air flow rate is equal to or greater than a second reference value.

The method of controlling an air blower for a fuel cell vehicle having the structure described above may maintain a sufficient air flow rate by detecting conditions in which an air flow rate should be increased such as driving at a substantially high elevation and by increasing a maximum operation amount of the air blower according to the detected conditions. In addition, the method may prevent abnormal operation of the air blower by detecting systemic problems such as clogging of an air channel and by reducing the maximum operation amount of the air blower to prevent excessive load to the air blower. In other words, it may be possible to enhance durability of the air blower by securing an appropriate air flow rate even under unfavorable driving conditions, by properly dealing with systemic troubles, and by preventing overload to the air blower.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of controlling an air blower for a fuel cell vehicle, comprising:
    determining, by a controller, an operation amount of the air blower to maintain a sufficient air flow rate under a present operating condition;
    obtaining, by the controller, information regarding clogging of an air channel or information regarding a back pressure using the determined operation amount of the air blower;
    changing, by the controller, a maximum operating range of the air blower in response to determining whether a present state is an air channel-clogged state or a back pressure-increased state;
    reducing, by the controller, a stored maximum operating range of the air blower when a present state is determined to be the air channel-clogged state by comparing a measured value of a present air flow with an estimated value of an air flow rate; and
    increasing, by the controller, the stored maximum operating range of the air blower when the present state is determined to be a back pressure-increased state by comparing a reference maximum output limit value of a fuel cell stack with a maximum output limit value at a present air flow rate.

2. The method of controlling an air blower for a fuel cell vehicle, according to claim 1, wherein the information regarding the clogging of the air channel is obtained by comparing an estimated value of an air flow rate and a measured value of an actual air flow rate of incoming air, and by determining whether a difference between the estimated value and the measured value is equal to or greater than a first predetermined reference value.

3. The method of controlling an air blower for a fuel cell vehicle, according to claim 2, wherein the air flow rate estimator is air flow rate map data in which an air flow rate with respect to a present operation amount of the air blower is mapped with an air flow rate at atmospheric pressure and room temperature.

4. The method of controlling an air blower for a fuel cell vehicle, according to claim 3, wherein the estimated air flow rate value is used to correct the air flow rate with respect to the present operation amount of the air blower by comparing the air flow map data based on atmospheric pressure and room temperature with an air flow rate at a present air pressure and a present air temperature.

5. The method of controlling an air blower for a fuel cell vehicle, according to claim 2, wherein the information regarding the clogging of the air channel is obtained by determining whether a state where a difference between the estimated value of an air flow rate and the measured value of an air flow rate is equal to or greater than the first predetermined reference value is maintained for a predetermined abnormal operation confirmation period.

6. The method of controlling an air blower for a fuel cell vehicle, according to claim 2, wherein when a present state is determined to be an air channel-clogged state based on a fact that the difference between the estimated value and the measured value is equal to or greater than the first predetermined reference value, a maximum operating range of the air blower is changed to a predetermined safe rotation count.

7. The method of controlling an air blower for a fuel cell vehicle, according to claim 6, further comprising:
    outputting, by the controller, a warning signal for warning a driver of the air channel-clogged state is generated when the maximum operating range of the air blower is changed to the safe rotation count.

8. The method of controlling an air blower for a fuel cell vehicle, according to claim 2, further comprising:
    determining, by the controller, whether the difference between the estimated value of an air flow rate and the measured value of an air flow rate is equal to or smaller than a first predetermined safe standard value when the difference between the estimated value of an air flow rate and the measured value of an air flow rate is determined to be equal to or less than the first predetermined reference value.

9. The method of controlling an air blower for a fuel cell vehicle, according to claim 8, further comprising:
    determining, by the controller, whether a state where the difference between the estimated value of an air flow rate and the measured value of an air flow rate is equal to or less than the first predetermined safe standard value is maintained for a safety confirmation period, and changing, by the controller, the maximum operating range of the air blower to an operating range under initial conditions in response to determining that the state where the difference between the estimated value of an air flow rate and the measured value of an air flow rate is equal to or less than the first predetermined safe standard value is maintained for the safety confirmation period.

10. The method of controlling an air blower for a fuel cell vehicle, according to claim 1, wherein the information regarding the back pressure-increased state is obtained by determining the operation amount of the air blower as a maximum operating range under initial conditions, by comparing a reference maximum output limit value of a fuel cell stack under present operating conditions and a maximum output limit value at a present actual air flow rate of incoming air, and by determining a difference between the reference maximum output limit value and the maximum output limit value at the present actual air flow rate is equal to or greater than a second predetermined reference value.

11. The method of controlling an air blower for a fuel cell vehicle, according to claim 10, wherein when a present state is determined to be a back pressure-increased state based on a fact that the difference between the reference maximum output limit value and the maximum output limit value at the present actual air flow rate is equal to or greater than the second predetermined reference value, the maximum operating range of the air blower is changed to a corrected rotation count.

12. The method of controlling an air blower for a fuel cell vehicle, according to claim 10, further comprising:
    determining, by the controller, whether the difference between the reference maximum output limit value and the maximum output limit value at the present actual air flow rate is equal to or less than a second predetermined safe standard value when the difference between the reference maximum output limit value and the maximum output limit value at the present actual air flow rate is determined to be equal to or less than the second predetermined reference value.

13. The method of controlling an air blower for a fuel cell vehicle, according to claim 12, further comprising:
   determining, by the controller, whether a state where the difference between the reference maximum output limit value and the maximum output limit value at the present actual air flow rate is equal to or less than the second predetermined safe standard value is maintained for a normal operation confirmation period or longer; and changing the maximum operating range of the air blower to an operating range under initial conditions.

* * * * *